United States Patent
Huegerich (10) Patent No.: US 9,662,947 B2
(45) Date of Patent: May 30, 2017

(54) DRAWBAR AUTO-CONNECT ASSEMBLY

(71) Applicant: Deere & Company, Moline, IL (US)

(72) Inventor: Tony J. Huegerich, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 261 days.

(21) Appl. No.: 14/520,492

(22) Filed: Oct. 22, 2014

(65) Prior Publication Data

US 2016/0114638 A1    Apr. 28, 2016

(51) Int. Cl.
| | |
|---|---|
| *B60D 1/04* | (2006.01) |
| *B60D 1/06* | (2006.01) |
| *B60D 1/07* | (2006.01) |
| *B60D 1/24* | (2006.01) |
| *B60D 1/46* | (2006.01) |
| *B60D 1/62* | (2006.01) |
| *A01B 59/00* | (2006.01) |
| *B62D 49/06* | (2006.01) |

(52) U.S. Cl.
CPC .............. *B60D 1/04* (2013.01); *A01B 59/002* (2013.01); *A01B 59/008* (2013.01); *B60D 1/06* (2013.01); *B60D 1/075* (2013.01); *B60D 1/246* (2013.01); *B60D 1/465* (2013.01); *B60D 1/62* (2013.01); *B62D 49/065* (2013.01)

(58) Field of Classification Search
CPC .. B60D 1/06; B60D 1/07; B60D 1/075; A01B 59/002; A01B 59/008; B62D 49/065
USPC ........................................................ 280/477
See application file for complete search history.

(56) References Cited

U.S. PATENT DOCUMENTS

| | | | |
|---|---|---|---|
| 2,429,761 A | 10/1947 | Ketel | |
| 2,817,541 A * | 12/1957 | Mathisen | B60D 1/345 280/406.2 |
| 3,297,340 A * | 1/1967 | Rendessy | B60D 1/32 280/432 |
| 3,436,096 A * | 4/1969 | Rogge | B60P 3/40 280/762 |

(Continued)

FOREIGN PATENT DOCUMENTS

| | | |
|---|---|---|
| EP | 1640190 A1 | 3/2006 |
| EP | 2676534 B1 | 12/2013 |

(Continued)

OTHER PUBLICATIONS

GDS GmbH, Gangl Docking System, product description web page, retrieved Oct. 8, 2014 from http://www.ganglsystems.com/en/product/.

(Continued)

*Primary Examiner* — Kevin Hurley
*Assistant Examiner* — Michael Stabley (57) ABSTRACT

A coupling assembly is provided for coupling an implement to a vehicle having a pickup hitch. The pickup hitch has a drawbar which is slidable in a pivotal drawbar housing. A coupler frame is attached to the implement, and has a socket which receives a ball mounted to the drawbar. Side members are attached to the coupler frame. Recesses are formed on the sides of the drawbar. In a coupled position, the side members are received by the recesses and are held between the drawbar housing and the drawbar.

15 Claims, 9 Drawing Sheets

(56) References Cited

U.S. PATENT DOCUMENTS

| | | | | |
|---|---|---|---|---|
| 3,497,240 A * | 2/1970 | Doerfer | B60D 1/065 | 280/406.2 |
| 3,588,809 A * | 6/1971 | Devlin | B60D 1/36 | 280/400 |
| 3,655,221 A * | 4/1972 | Warner | B60D 1/46 | 280/406.2 |
| 3,716,253 A * | 2/1973 | Gniffke | A01B 59/043 | 172/248 |
| 3,989,269 A * | 11/1976 | Rendessy | B60D 1/32 | 280/455.1 |
| 4,033,601 A * | 7/1977 | Lindahl | B60D 1/46 | 280/490.1 |
| 4,131,295 A * | 12/1978 | Highberger | B60S 9/04 | 280/475 |
| 4,156,551 A * | 5/1979 | Nagase | B60D 1/62 | 439/195 |
| 4,368,899 A | 1/1983 | Smalley et al. | | |
| 4,640,365 A * | 2/1987 | Schmidt | A01B 69/004 | 104/244.1 |
| 4,738,463 A * | 4/1988 | Poore | A01B 59/062 | 280/420 |
| 4,763,743 A | 8/1988 | Ridgway | | |
| 5,029,650 A * | 7/1991 | Smit | A01B 59/062 | 172/272 |
| 5,193,838 A * | 3/1993 | Olson | B60D 1/26 | 280/478.1 |
| 5,362,084 A * | 11/1994 | Edwards | B60D 1/28 | 280/432 |
| 5,799,965 A * | 9/1998 | Kass | B60D 1/247 | 280/406.1 |
| 5,984,019 A * | 11/1999 | Hund | A01B 59/068 | 172/272 |
| 6,062,321 A | 5/2000 | Defrancq | | |
| 6,193,259 B1 * | 2/2001 | Rupard | A01B 59/043 | 172/275 |
| 6,268,800 B1 * | 7/2001 | Howard | B60D 1/305 | 340/431 |
| 6,595,299 B2 * | 7/2003 | Heller | A01B 59/043 | 172/272 |
| 7,210,888 B2 * | 5/2007 | Bearden | A01D 90/083 | 172/439 |
| 7,290,977 B2 | 11/2007 | Albright et al. | | |
| 7,717,189 B2 | 5/2010 | Shoup | | |
| 7,905,555 B2 * | 3/2011 | Huntimer | B60D 1/30 | 188/112 A |
| 8,187,020 B2 * | 5/2012 | Alguera Gallego | B60D 1/64 | 439/378 |
| 8,555,995 B2 * | 10/2013 | Harris | A01B 59/064 | 172/439 |
| 8,770,612 B2 * | 7/2014 | Wendte | B60D 1/363 | 280/420 |
| 2012/0068438 A1 | 3/2012 | Kollath | | |
| 2013/0133905 A1 | 5/2013 | Valet | | |
| 2013/0277943 A1 | 10/2013 | Wendte et al. | | |

FOREIGN PATENT DOCUMENTS

| | | |
|---|---|---|
| FR | 2995756 A1 | 3/2014 |
| GB | 2429195 A | 2/2007 |

OTHER PUBLICATIONS

European Search Report issued in counterpart application No. 15187196.9, dated May 11, 2016 (7 pages).

* cited by examiner

DRAWBAR AUTO-CONNECT ASSEMBLY

FIELD

The present disclosure relates to a tractor-implement drawbar auto-connect assembly.

BACKGROUND

A tractor or utility vehicle used for agricultural work may be coupled to an implement which has electrical couplers, hydraulic couplers and/or a PTO which must be connected to the tractor couplers and to the tractor PTO. Implements are not utilized full time with a tractor, so it is desirable that a coupling mechanism allow quick, easy connecting and disconnecting of the implement. It is known in the prior art to resiliently mount the mating fittings of quick disconnect couplings on the drawn and drawing halves of a hitch, along with means for guiding the fittings such that the connection of the coupler can be made automatically as part of the hitching process. U.S. Pat. No. 4,368,899, issued to Smalley et al., depicts a hitch arrangement of this type. While this type of system illustrates automatic coupling of a fluid connector, it also requires that, in order to join the coupler halves, the actuator system supply additional motion beyond that necessary to join the hitch elements. Smalley et al. also teaches the use of a stabilizing rod to restrain movement of the connectors during the coupling process. The need to supply additional motion and the use of a stabilizing rod adds cost and complexity to the hitch system. It is desired to provide a tractor/implement coupler mechanism where the implement coupler automatically locates and locks in position with the tractor coupler without the operator having to leave the tractor cab.

SUMMARY

According to an aspect of the present disclosure, a coupling assembly couples an implement to a vehicle having a pickup hitch. The pickup hitch has a drawbar housing which is pivotal about a horizontal axis and a drawbar which is slidable in the drawbar housing. The coupling assembly includes a coupler frame attached to the implement. The coupler frame has a coupler member for releasably coupling to the drawbar. A side member is attached to the coupler frame. The drawbar includes a pair of recesses which are formed on the sides of the drawbar. The recess is defined by a plurality of surfaces formed on the drawbar. The surfaces include a rearwardly facing front wall, a top wall, and a side wall.

The recess receives a portion of the side member when the coupler frame is pulled into a coupled position by the drawbar. In the coupled position, the side member is held between the drawbar housing and the drawbar. The side member engages the front wall and the top wall when the coupler frame is pulled into a coupled position by the drawbar. The top wall 32 faces downwardly and extends rearwardly from an upper edge of the front wall 30. The drawbar includes a slanted wall 34 which extends upwardly and rearwardly from the top wall 32. The drawbar includes an end wall 36 which extends upwardly from a rear edge of the slanted wall 34. The side wall 38 faces laterally outwardly from the drawbar 22. The side wall 38 is joined to an inner edge of the front wall 30 and to inner edges of the top wall 32 and the slanted wall 34. The guide wall 40 extends laterally inwardly and rearwardly from rear edges of the side wall 38 and the end wall 36. The guide wall 40 has a rear edge which is joined to a side surface 42 of a central part 44 of the drawbar 22. The bottom wall 46 extends laterally inwardly and downwardly from a bottom edge of the side wall 38 and is joined to an outer edge of the guide wall 40. An inner edge of the bottom wall 46 is joined to the side surface 42.

With this coupling assembly, a tractor can be connected to an implement while the drawbar remains attached to the implement. The tractor pick up hitch includes a drawbar upon which is mounted a hitch ball which is received by a socket on the implement coupler frame. Recesses are machined into the sides of the drawbar rail. The recesses receive members which are attached to the implement coupler frame. The hitch ball is backed under the implement coupler frame and inserted into the socket. Raising the pick up hitch causes the implement coupler frame to locate and lock in the resesses in the drawbar rail. This action locks the drawbar straight and prevents any motion about the hitch ball. When the pick up hitch is pulled in, the implement coupler frame is captured by the housing of the pick up hitch so the socket cannot come off the ball. Thus, once the hitch ball is in the socket, the rest of is coupling process can be performed without the operator leaving the cab of the tractor.

DETAILED DESCRIPTION OF THE DRAWINGS

Figure 1:
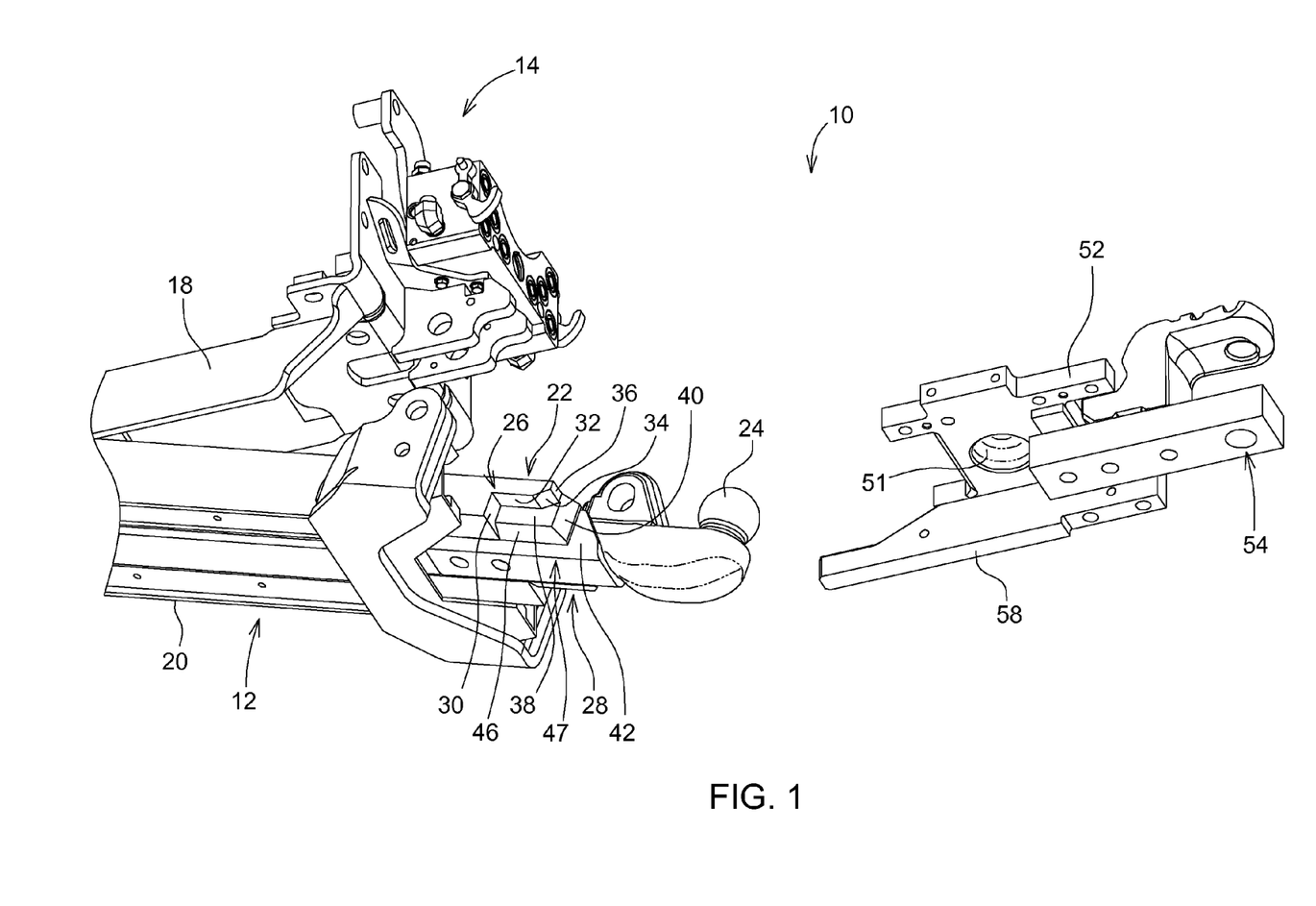
FIG. 1 is a bottom side perspective view of a tractor-implement connection assembly embodying the invention, with parts removed for clarity.
Figure 2:
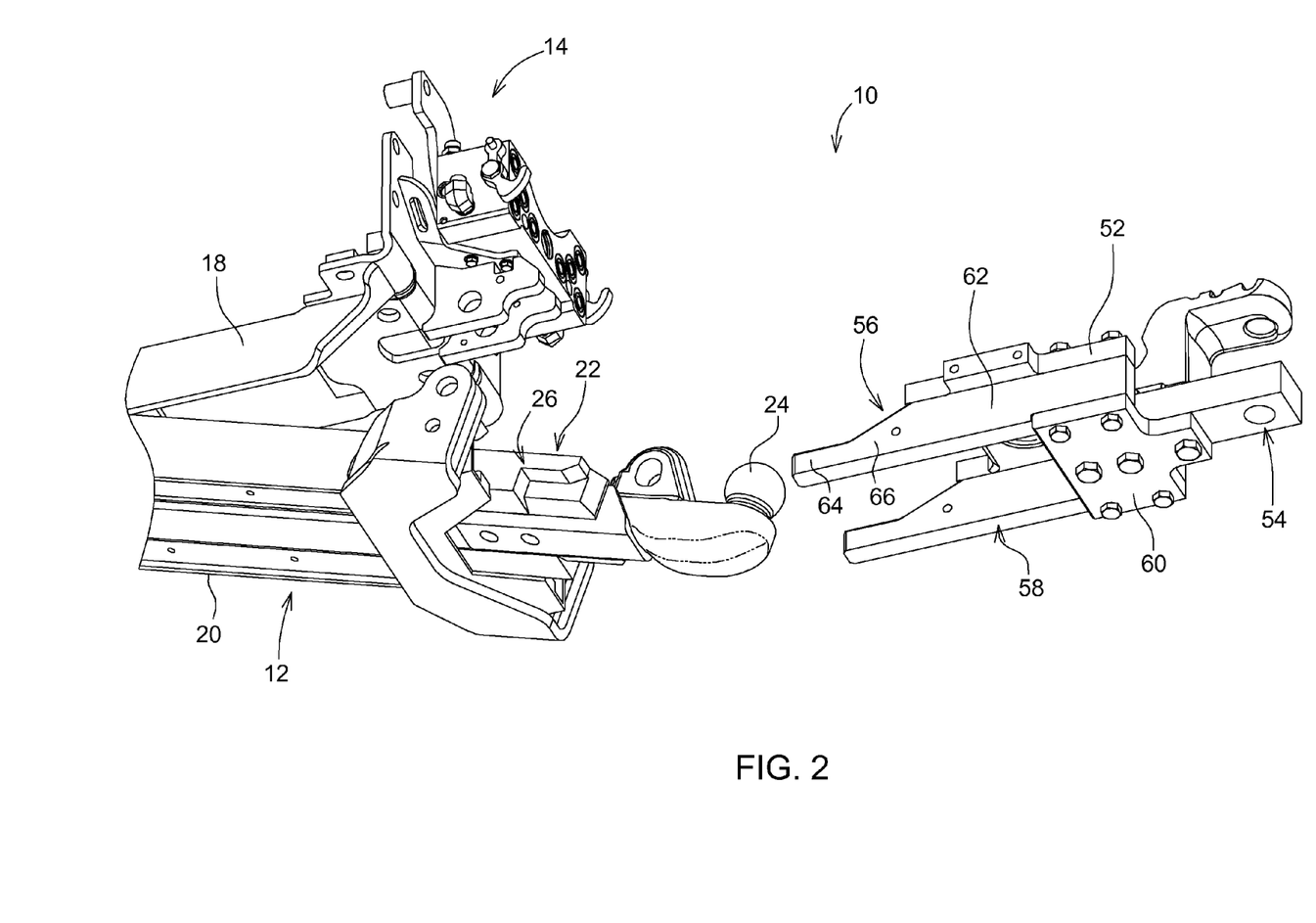
FIG. 2 is another bottom side perspective view of the tractor-implement connection assembly coupler of FIG. 1.
Figure 3:
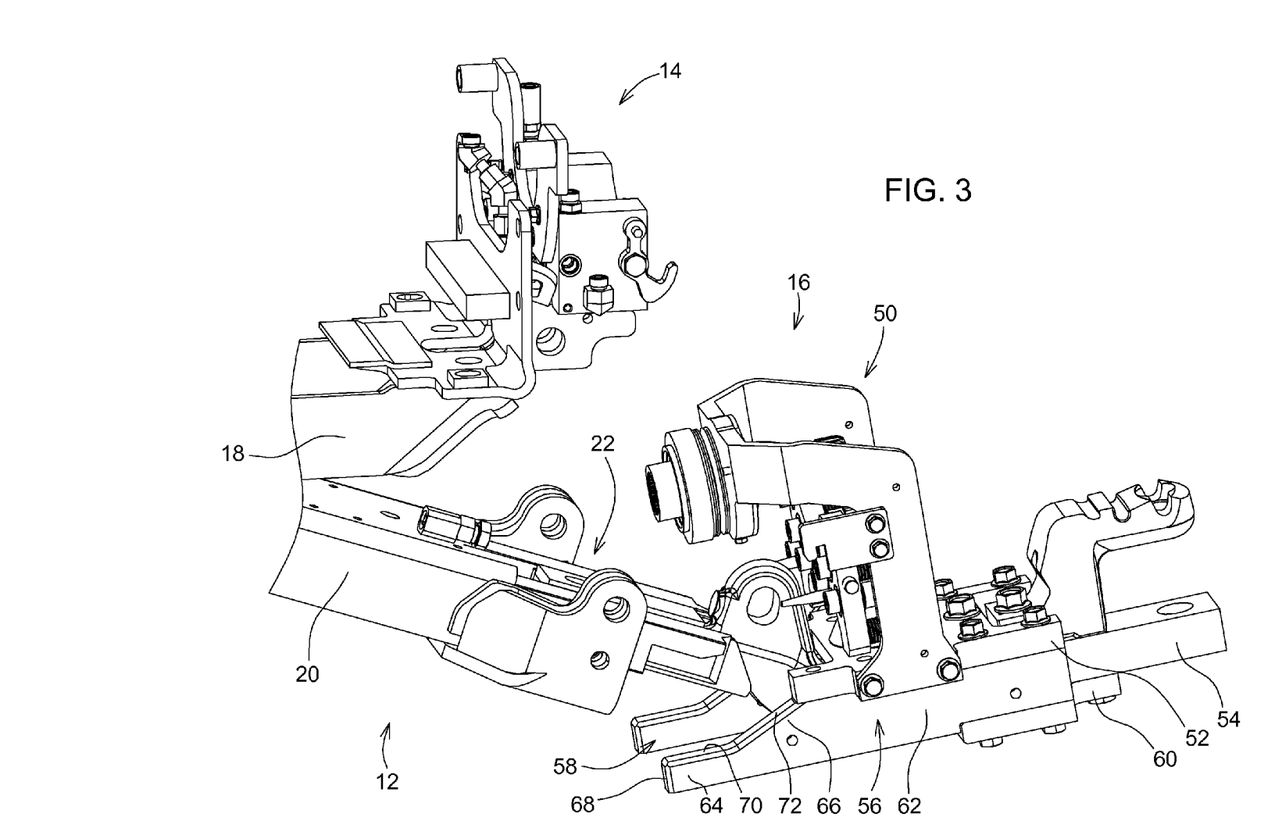
FIG. 3 is an upper side perspective view of the tractor-implement connection assembly coupler of FIGS. 1 and 2.

Referring to FIGS. 1, 2 and 3, a coupling assembly 10 couples an implement to a vehicle which has a pick up hitch 12. The pick up hitch 12 is mounted to a rear vehicle housing (not shown). The coupling assembly 10 includes a tractor coupler 14 and an implement coupler 16. The tractor coupler 12 is mounted on the hollow outer housing 18 of the pick up hitch 12. The tractor coupler 14 is mounted to a rear portion of the outer housing 18. The pick up hitch 12 has a hollow inner housing 20 which is pivotally coupled to a front portion of the outer housing 18 about a transverse horizontal axis. A drawbar 22 is slidable in the inner housing 20 and a cylinder (not shown) extends and retracts the drawbar 22. The drawbar 22 supports a hitch ball 24.

Left and right alignment recesses 26 and 28 are formed on the left and right sides of the drawbar 22. The left and right alignment recesses 26 and 28 are preferably mirror images of each other, so the following description of the left recess 26 will apply to the right recess 28 as well. The left recess 26 is defined a plurality of walls or surfaces which are formed on a rear portion of the drawbar 22. These surfaces include a rearwardly facing front wall 30, a top wall 32, a slanted wall 34, and end wall 36 and a side wall 38. The top wall 32 faces downwardly and extends rearwardly from an upper edge of the front wall 30. The slanted wall 34 extends upwardly and rearwardly from the top wall 32. The end wall 63 extends upwardly from a rear edge of the slanted wall 34.

The side wall 38 faces laterally outwardly from the drawbar 22. The side wall 38 is joined to the inner or right edge of front wall 30 and to the inner edges of top wall 32 and slanted wall 34. A guide wall 40 extends laterally inwardly and rearwardly from the rear edges of side wall 38 and end wall 36. The rear edge of guide wall 40 is joined to a side surface 42 of a central part 44 of the drawbar 22. A bottom wall 46 extends laterally inwardly and downwardly from a bottom edge of side wall 38 and is joined to an outer edge of guide wall 40. The inner edge of bottom wall 46 is joined to the side surface 42 of the central part 44 of the drawbar 22.

The implement coupler 16 includes a base 52 which is adapted to support a coupler frame 50. The base 52 is attached to an implement tongue 54. Spaced apart left and right side members 56 and 58 are attached to the underside of the base 52. As best seen in FIG. 1, the base 52 forms a downwardly opening socket 51 which releasably receives the hitch ball 24. As a result, the pick up hitch 12 is operable to pull the implement coupler 16 towards the tractor coupler 14. As best seen in FIG. 2, the side member 56 and 58 are held between the base 52 and a bottom plate 60 which is attached to the base 52 and to the tongue 54 by a plurality of bolts.

The following description pertains to the left side member 56. The corresponding right side member 58 is not described further since it is a mirror image of the left side member 56. As best seen in FIGS. 2 and 3, the left side member 56 includes a vertically thicker main body 62 and a vertically thinner front or guide member 64. Guide member 64 is joined to main body 62 by a tapered transition portion 66. Guide member 64 forms a front end wall 68 and an upper wall 70. Transition portion 66 forms a slanted upper surface 72.

Figure 4:
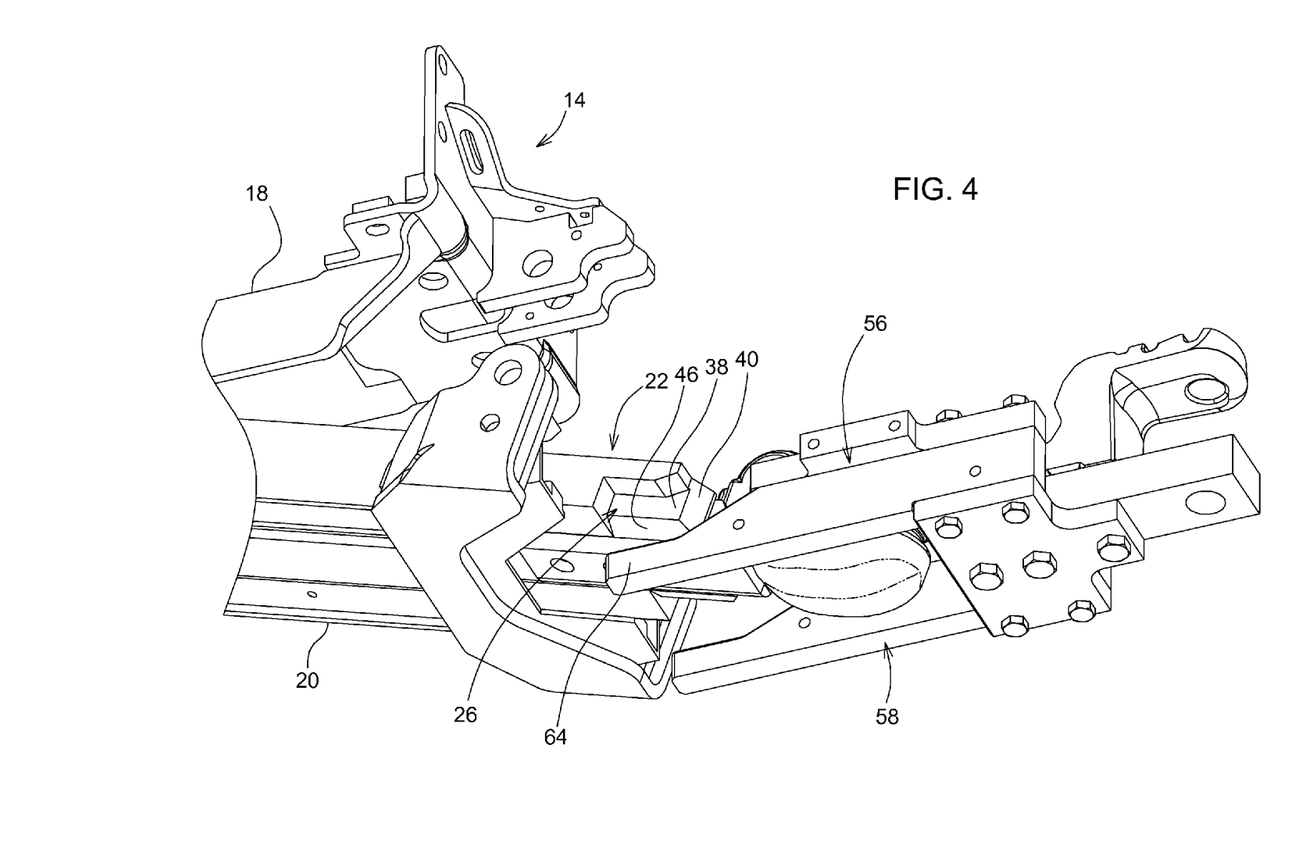
FIGS. 4-8 are bottom side perspective views of the tractor-implement connection assembly coupler of FIG. 1 showing its transition from an uncoupled condition to a fully coupled condition.
Figure 5:
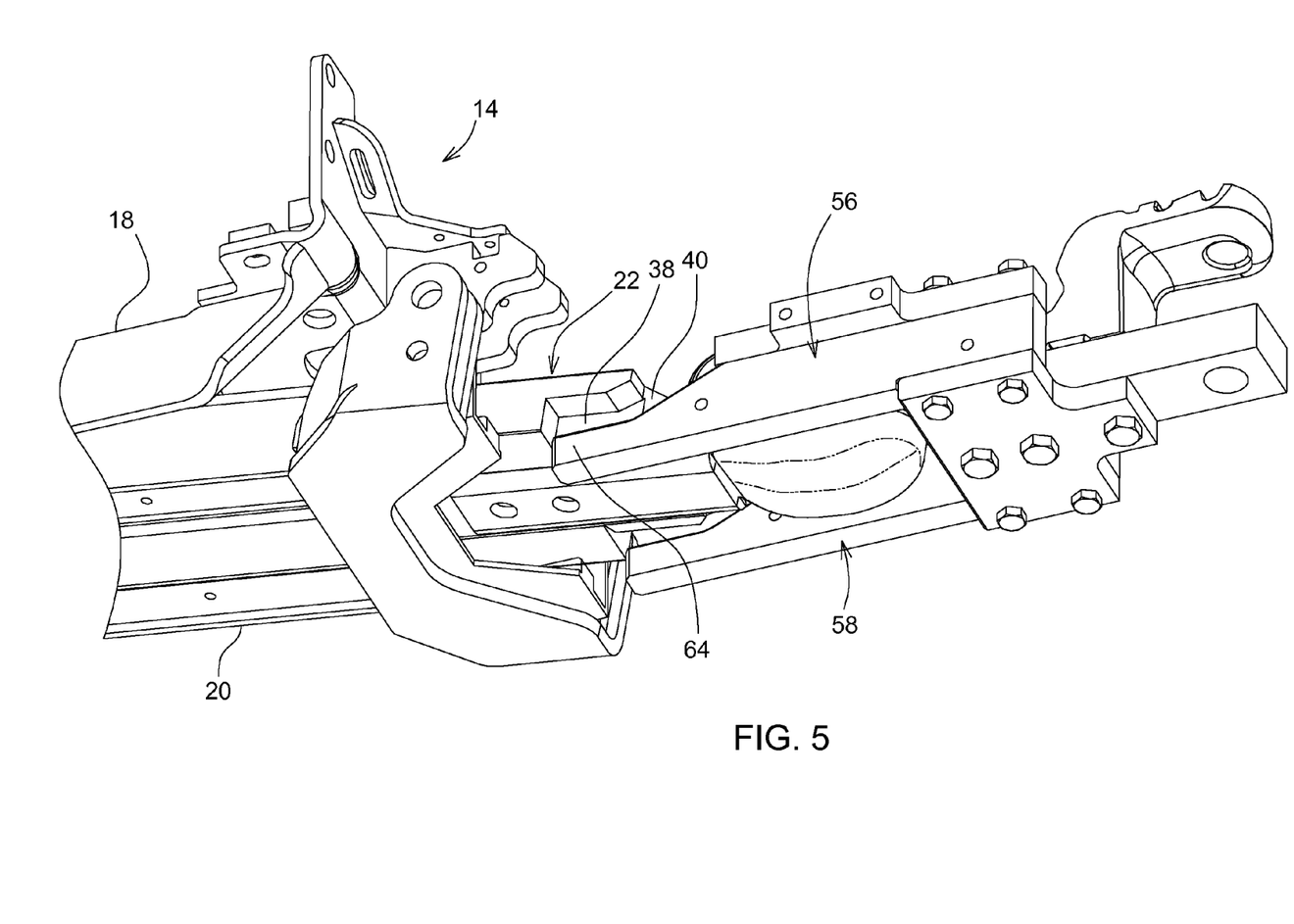
Figure 6:
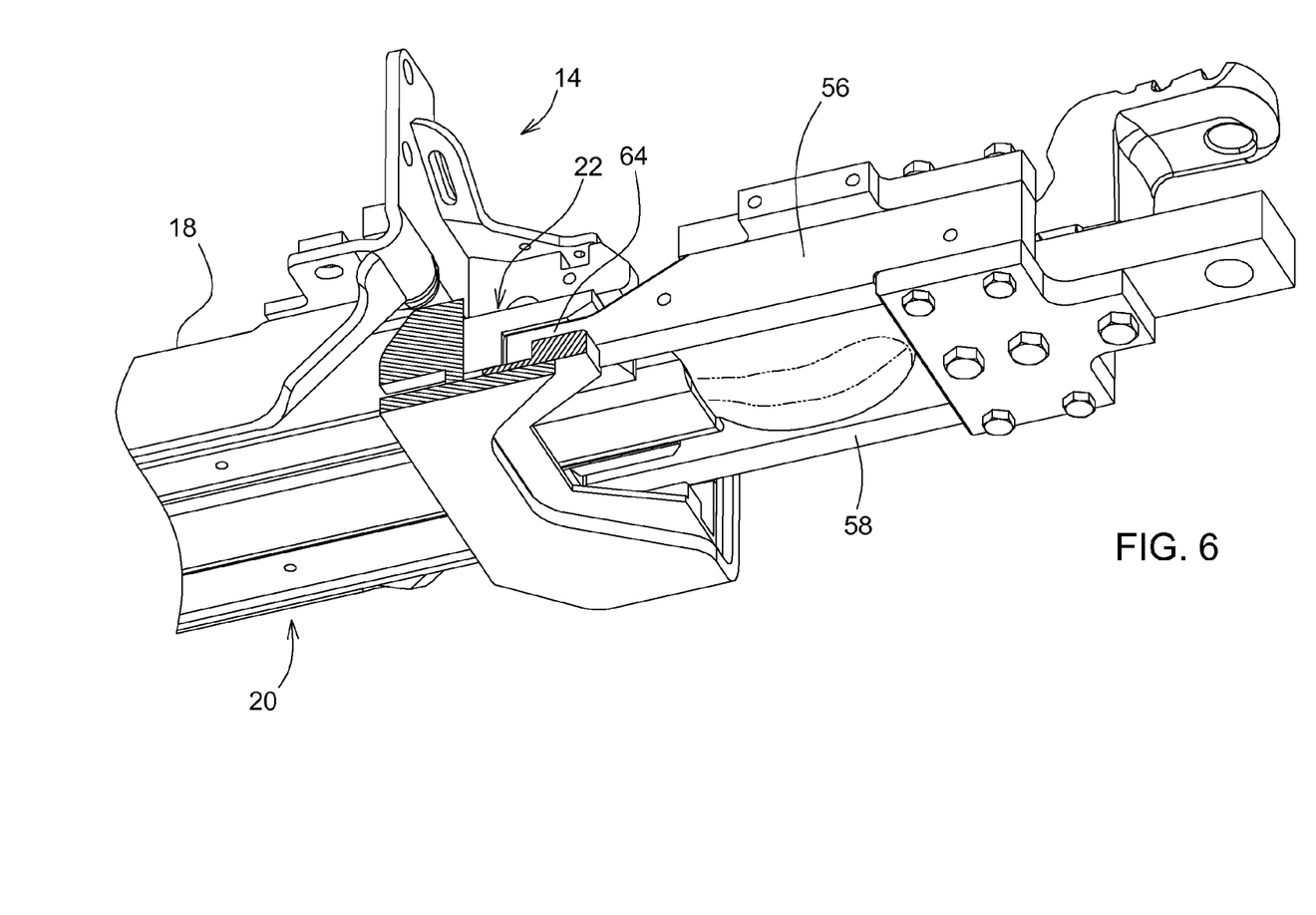
Figure 7:
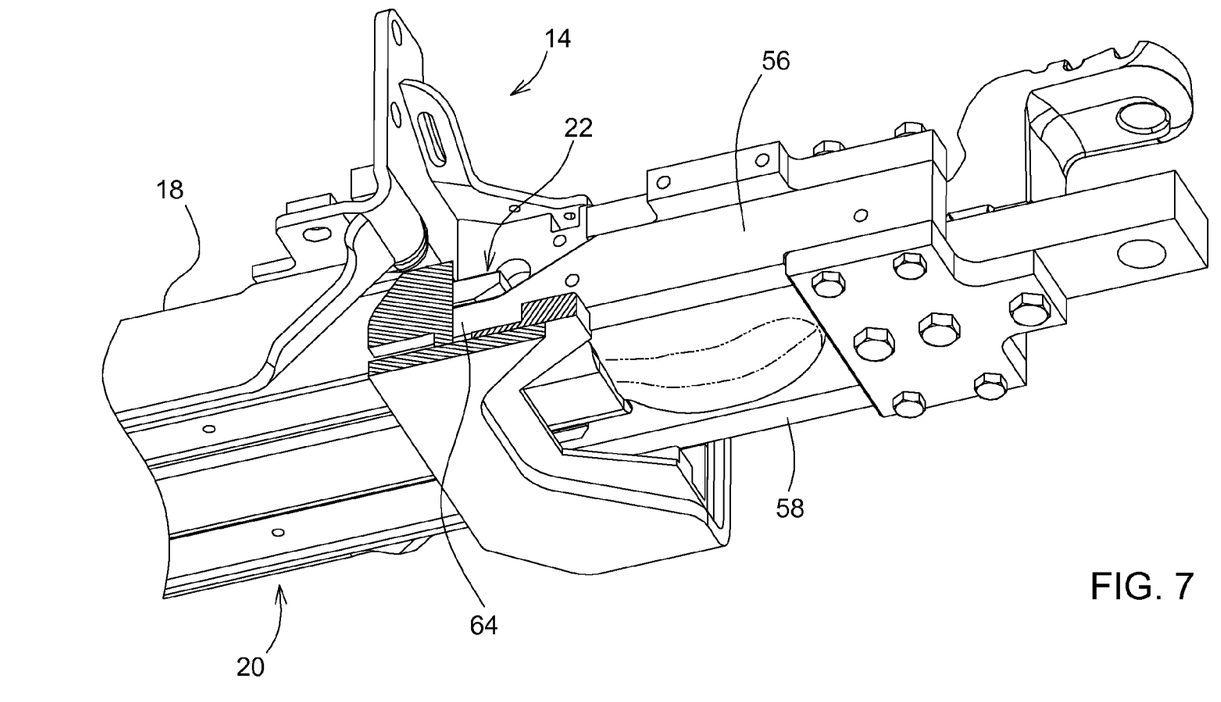
Figure 8:
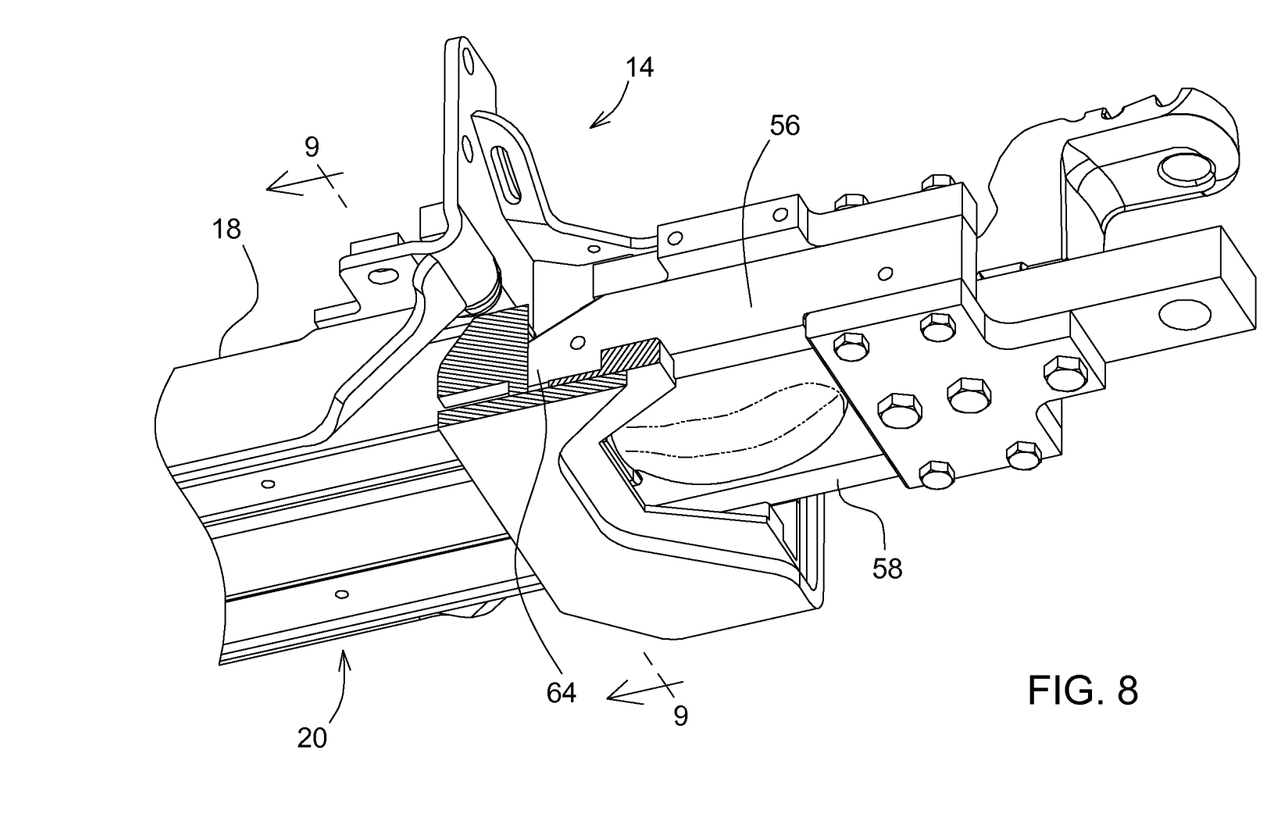
Figure 9:
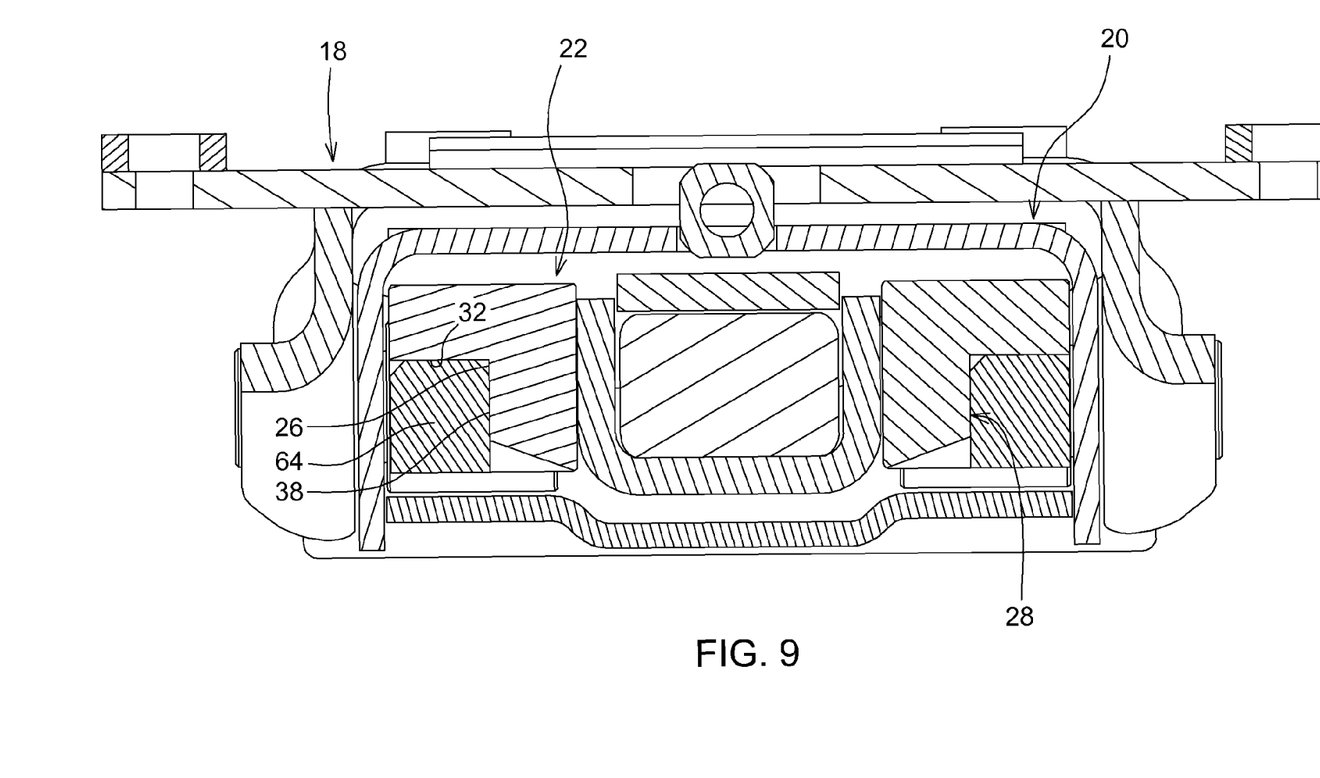
FIG. 9 is a sectional view along lines 9-9 of FIG. 8.

Referring to FIGS. 4-5, as the drawbar 22 is retracted into the inner housing 20, the walls 40 and 46 may help guide the guide member 64 into alignment and sliding engagement with side wall 38. Then, referring to FIGS. 6-8, as the drawbar 22 is further retracted into the inner housing 20, the guide member 64 is received by the recess 26 until end wall 68 engages wall 30 and upper wall 70 engages top wall 32. Also, as best seen in FIG. 9, the guide member 64 is held laterally between the side wall 38 and the inner surface of the inner housing 20. In this condition, the implement coupler 16 will be properly aligned with the tractor coupler 14.

Mode of Operation

The hitch ball 24 is inserted into and left in the socket 51, so that the implement coupler 16 is connected to the drawbar 22. The pick up hitch 12 is then raised to cause the side members 56 and 58 to locate and lock under the recesses 26 and 28 in the drawbar 22. This action locks the drawbar 22 straight and prevents any motion about the hitch ball. The drawbar 22 is then retracted into the housing 20, and the side members 56 and 58 are captured between the pick up hitch housing 20 and the drawbar 22, so the implement coupler 16 cannot come off the ball 24.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A coupling assembly for coupling an implement to a vehicle having a pickup hitch, the pickup hitch having a drawbar housing which is pivotal about a horizontal axis and a drawbar slidable in the drawbar housing, the coupling assembly comprising:
 a coupler frame adapted to be attached to the implement, the coupler frame having a coupler member for releasably coupling to the drawbar;
 a side member attached to the coupler frame; and
 a recess formed on the drawbar, the recess being defined by a plurality of surfaces formed on the drawbar, said surfaces comprising a rearwardly facing front wall, a top wall, and side wall, the recess receiving a portion of the side member when the coupler frame is pulled into a coupled position by the drawbar, wherein the side member engages the front wall and the top wall when the coupler frame is pulled into the coupled position by the drawbar.

2. The coupling assembly of claim 1, wherein: the top wall faces downwardly and extends rearwardly from an upper edge of the front wall.

3. The coupling assembly of claim 1, wherein:
 the drawbar comprises a slanted wall which extends upwardly and rearwardly from the top wall.

4. The coupling assembly of claim 3, wherein:
 the drawbar comprises an end wall which extends upwardly from a rear edge of the slanted wall.

5. The coupling assembly of claim 1, wherein:
 the side wall faces laterally outwardly from the drawbar.

6. The coupling assembly of claim 1, wherein:
 in the coupled position, the side member is held between the drawbar housing and the drawbar.

7. The coupling assembly of claim 3, wherein:
 the side wall is joined to an inner edge of the front wall and to inner edges of the top wall and the slanted wall.

8. The coupling assembly of claim 4, wherein:
 a guide wall extends laterally inwardly and rearwardly from rear edges of the side wall and the end wall.

9. The coupling assembly of claim 8, wherein:
 the guide wall has a rear edge which is joined to a side surface of a central part of the drawbar.

10. The coupling assembly of claim 9, wherein:
 a bottom wall extends laterally inwardly and downwardly from a bottom edge of the side wall and is joined to an outer edge of the guide wall.

11. The coupling assembly of claim 10, wherein:
 an inner edge of the bottom wall is joined to the side surface.

12. A coupling assembly for coupling an implement to a vehicle having a pickup hitch, the pickup hitch having a drawbar housing which is pivotal about a horizontal axis and a drawbar slidable in the drawbar housing, the coupling assembly comprising:
 a coupler frame adapted to be attached to the implement, the coupler frame having a coupler member for releasably coupling to the drawbar;
 a side member attached to the coupler frame; and
 a recess formed on the drawbar, the recess receiving a portion of the side member when the coupler frame is pulled into a coupled position by the drawbar, in the coupled position, the side member being held between the drawbar housing and the drawbar.

13. The coupling assembly of claim 12, wherein:
the recess is defined by a plurality of surfaces formed on the drawbar, said surfaces comprising a rearwardly facing front wall, a top wall, and side wall.

14. The coupling assembly of claim 13, wherein:
the side member engages the front wall and the top wall when the coupler frame is pulled into a coupled position by the drawbar.

15. The coupling assembly of claim 13, wherein:
the top wall faces downwardly and extends rearwardly from an upper edge of the front wall.

\* \* \* \* \*